United States Patent [19]

Takemura et al.

[11] 4,374,946

[45] Feb. 22, 1983

[54] CONCRETE JOINT SEALANT

[75] Inventors: Yoshifumi Takemura; Hirokazu Miyazaki, both of Hiroshima, Japan

[73] Assignee: Aoi Chemical Inc., Hiroshima, Japan

[21] Appl. No.: 304,602

[22] Filed: Sep. 22, 1981

[30] Foreign Application Priority Data

Sep. 29, 1980 [JP] Japan ................. 55-135610

[51] Int. Cl.$^3$ ............................. C08L 93/04
[52] U.S. Cl. ................... 524/271; 524/274; 524/425; 524/445; 524/451
[58] Field of Search ............ 260/27 R, 27 BB, 23 S, 260/23.7 R, 23.7 B, 23.7 M; 524/271, 274, 425, 445, 451

[56] References Cited

U.S. PATENT DOCUMENTS 2,532,197 11/1950 Rowe ................................. 106/182
2,647,063 7/1953 Willis et al. ...................... 106/241
3,993,613 11/1976 Doss et al. ...................... 260/27 R Primary Examiner—Melvyn I. Marquis
Attorney, Agent, or Firm—Stevens, Davis, Miller & Mosher

[57] ABSTRACT

A concrete joint sealant comprising tall pitch, atactic polypropylene, fresh rubber and aliphatic hydrocarbon resin.

7 Claims, 2 Drawing Figures

F I G. 1
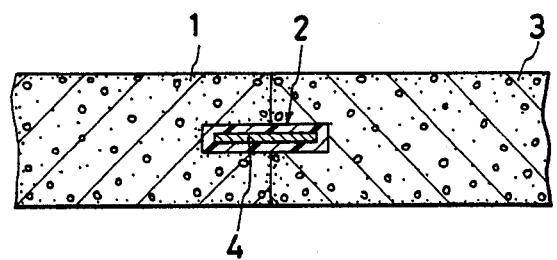
F I G. 2
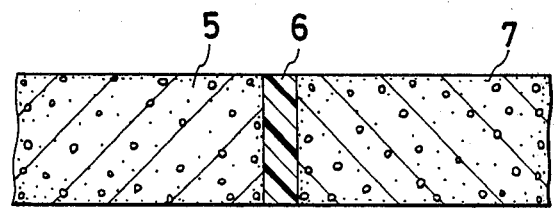

CONCRETE JOINT SEALANT

BACKGROUND OF THE INVENTION

1. Field of the Invention

The present invention relates to a concrete joint sealant which is used as water-stop material or sealant at joints in concrete structures in civil engineering and construction.

2. Prior Art

Discontinuities in concrete structure such as joints, insulation zones and elastic cushions for stress are sealed with specific materials to prevent or stop water leakage or to allow for thermal expansion or contraction of the concrete.

Materials widely used in the prior art mainly comprise polysulfide, urethane rubber, silicone rubber or rubberized asphalt. Because these materials lack bondability to ready-mixed concrete, however, they cannot be bonded to the concrete even when placed simultaneously with the application of the ready-mixed concrete. Recently, a sealant mainly composed of non-vulcanized or semi-vulcanized reclaimed rubber which is bondable to the hardened concrete with the hardening of ready-mixed concrete has been used in the art.

SUMMARY OF THE INVENTION

The primary object of the present invention is to provide a sealant for concrete joints with excellent bondability to concrete.

Another object of the present invention is to provide a sealant for concrete joints with excellent anti-aging properties.

Still another object of the present invention is to provide a sealant for concrete joints which is easy to produce and inexpensive.

The concrete joint sealant according to the present invention, composed of tall pitch, by-produced as a residue in the rectification of tall oil, atactic polypropylene, fresh rubber and aliphatic hydrocarbon, manifests excellent bondability to concrete and is incorporated with the concrete upon hardening without using reclaimed rubber.

Many other features, advantages and objects of the present invention will become manifest to those versed in the art upon making reference to the detailed description which follows and to the accompanying sheet of drawings.

BRIEF DESCRIPTION OF THE DRAWINGS

FIG. 1 is a sectional view illustrating an example of a sealant according to the present invention which is used for the purpose of preventing water leakage; and FIG. 2 is a sectional view illustrating an example of the sealant according to the present invention which is used for the purpose of sealing a concrete joint.

DETAILED DESCRIPTION OF THE INVENTION

The present invention has been accomplished by the discovery that tall pitch, i.e., a by-product residue from the rectification of tall oil, when mixed in the sealant, can assure good bondability of the sealant to concrete.

The tall pitch to be employed in the present invention may include what is commercially named "Ha-tall pitch", which is a mixture of alcohol and rosin fatty acid ester, which remains after extraction of tall fatty acid, tall rosin and tall oil from crude tall oil produced as a by-product in the manufacture of pulp.

"Ha-tall pitch" has the following composition:

| | | |
|---|---|---|
| Hydroxy acid | hydroxystearic acid, hydroxy abietic acid, etc. | 5% |
| Fatty acid and its ester | oleic acid, linolic acid, eicosanic acid, decosanoic acid β-sitosterol, abietylol, etc. | 30% |
| Rosin | abietic acid, dehydroabietic acid, etc. | 25% |
| Unsaponifiable matter | sterol, alcohol, etc. | 40% |
| Acid value | 19 to 35 | |
| Viscosity | 700 to 1200 cps (at 80° C.) | |

In addition to "Ha-tall pitch", "Etol P" of Arakawa Rinsan Kagaku is available as tall pitch.

The general composition of tall pitch is as follows:

| | | |
|---|---|---|
| Hydroxy acid | hydroxystearic acid, hydroxyabietic acid, etc. | 0 to 10% |
| Fatty acid and its ester | oleic acid, linolic acid, eicosanic acid, decosanoic acid, β-sitosterol, abietylol, etc. | 20 to 40% |
| Rosin | abietic acid, dehydroabietic acid, etc. | 15 to 30% |
| Unsaponifiable matter | sterol, alcohol, etc. | 30 to 50% |

According to the present invention, tall pitch is preferably added in the amount of 20 to 80 weight parts per 100 weight parts of atactic polypropylene. If the addition of the tall pitch is less than 20 weight parts, the bondability of the sealant to ready-mixed concrete will drop, while if it exceeds 80 weight parts, the sealant will be liable to sag and shape retention will deteriorate.

Atactic polypropylene of this invention is obtainable as a by-product of, for example, isotactic polypropylene or syndiotactic polypropylene. Addition of this substance improves extrusion moldability and shape retention at high temperatures, as well as improving the weatherability of the sealant to which the substance is added. Addition of atactic polypropylene is preferably in the amount of 20 to 50 weight parts per 100 weight parts of the total sealant material; if it is less than 20 weight parts, the extrusion moldability will become poor, but if it exceeds 50 weight parts, the restoring property will deteriorate.

Non-reclaimed synthetic or natural rubber plays the role of imparting elasticity to the sealant, thereby making it possible for the sealant to absorb expansion-contraction stress in a concrete structure. For this reason, it is necessary to add fresh instead of reclaimed rubber. Fresh butyl rubber or styrenebutadiene rubber may be used for this purpose.

Addition of fresh rubber is preferably in the amount of 30 to 60 weight parts per 100 weight parts of atactic polypropylene; if it is less than 30 weight parts, the extensibility or restoring property of the sealant will deteriorate, but if it is more than 60 weight parts, the shape retention at high-temperature (about 70° C.) will deteriorate.

As the resin of aliphatic hydrocarbons to be used in the present invention, anything suitable for addition to rubber plastics will do; for instance, the commercially available "Alcon P-125" (trade name), i.e., a polymerized unsaturated hydrocarbon composed of aliphatic diolefines, as obtained in pyrolysis of naphtha, will do. "Highlet" (trade name), which is sold by Mitsui Petrochemical, will also suffice.

The effect of the inclusion of aliphatic hydrocarbon resin is an improvement in the compatibility of atactic polypropylene with rubber, and reinforcement of the sealant. The addition of aliphatic hydrocarbon resin is preferably in the amount of 80 to 150 weight parts per 100 weight parts of fresh rubber; if it is less than 80 weight parts, the effects of improving the compatibility of atactic polypropylene and rubber and reinforcing the sealant will be insufficient, but if it is more than 150 weight parts, the restoring property of the sealant will become poor.

A filler for viscosity adjustment or increase in weight of the sealant or an anti-aging agent to prevent the aging of the sealant may be added to the sealant according to the present invention. Suitable fillers include calcium carbonate, talc, clay, etc., while suitable anti-aging agents include the commercial "Nocrack 600" (trade name).

The sealant according to the present invention may be molded to a desired form after mixing the above elements, heating the mixture to about 180° C., kneading it homogeneously and then cooling it, or it may be used as a mastic after the same process but without molding.

Use of the sealant according to the present invention is illustrated in the drawings. FIG. 1 shows an example of its use as a water stopper. Prior to concrete placement, the sealant 2 is set and then the first section of concrete 1 is applied. After hardening of the concrete, the second section of concrete 3 is applied. The numeral 4 in FIG. 1 represents a metal plate or synthetic resin plate as hard as a metal plate. Introduction of such a plate as the core material will prevent deformation or dislocation of the sealant due to the pressure upon application of the concrete, thereby assuring correct positioning of the sealant. FIG. 2 shows an example of using the sealant for filling a concrete joint. The sealant 6 is placed on the side surface of an already placed and hardened section of concrete 5 using a bonding agent, and then ready-mixed concrete 7 is applied.

specific examples to be given here are for illustrative purposes only and are not intended to restrict the application of the present invention in any way.

EXAMPLE 1

| | |
|---|---|
| Atactic polypropylene | 100 weight parts |
| Fresh butyl rubber | 50 weight parts |
| "Ha-tall pitch" (trade name) | 50 weight parts |
| Calcium carbonate | 100 weight parts |
| Aliphatic hydrocarbon resin ("Alcon P-125") | 50 weight parts |

The above components were mixed together, heated to about 180° C., homogeneously kneaded, cooled and then molded, yielding a sealant according to the present invention.

EXAMPLE 2

Using the same procedure as in Example 1, the following components were homogeneously mixed together to produce a sealant according to the present invention:

| | |
|---|---|
| Atactic polypropylene | 100 weight parts |
| Fresh styrenebutadiene rubber | 40 weight parts |
| "Ha-tall pitch" | 60 weight parts |
| Calcium carbonate | 100 weight parts |
| Aliphatic hydrocarbon resin ("Alcon P-125") | 40 weight parts |
| Anti-aging agent ("Nocrack 600") | 2 weight parts |

EXAMPLE 3

In the same way as in Example 1, the following components were homogeneously mixed to produce a sealant according to the present invention:

| | |
|---|---|
| "Ha-tall pitch" | 2.5 Kg |
| Fresh butyl rubber | 2.7 Kg |
| Atactic polypropylene | 8.8 Kg |
| "Alcon P-125" | 2.6 Kg |
| Calcium carbonate | 0.2 Kg |
| Carbon | 0.2 Kg |

TEST EXAMPLE

Extrusion-molded products of 50×15×20 mm of the sealants according to the present invention prepared in Examples 1 to 3 were submitted to testing for physical properties. The results are summarized in the following table.

TABLE

| | | Example 1 | Example 2 | Example 3 | Testing Method* |
|---|---|---|---|---|---|
| Tensile Strength | Elongation (%) | 500 | 400 | 700 | JIS-K-6301 |
| | (Kg/cm²) | | | 1.0 | JIS-K-6301 |
| Bondability to ready-mixed concrete (Kg/cm²) | | 2.2 Cohesive failure | 3.0 Cohesive failure | 2.4 Cohesive failure | See Note |
| Needle penetration (× 10⁻¹ mm) | 0° C. | — | — | 25 | JIS-K-2530 |
| | 10° C. | — | — | 31 | |
| | 25° C. | 48 | 43 | 53 | |
| | 40° C. | — | — | 91 | |
| Flow (mm) | | — | — | 0 | 60° C. 75 deg. inclination 5 hrs. |

TABLE-continued

| | Example 1 | Example 2 | Example 3 | Testing Method* |
|---|---|---|---|---|
| Softening point (°C.) | — | — | 122 | JIS-K-2531 |
| Specific gravity | — | — | 0.97 | JIS-Z-8807 |

*"JIS-K-6301", "JIS-K-2530", "JIS-K-2531" and "JIS-Z-8807" are the methods specified by "Japanese Industrial Standard".
Note - Ready-mixed concrete (cement: standard sand: water = 1 : 2 : 0.5) is packed into a 50 × 100 × 20 mm mold, with a 50 × 15 × 20 mm sealant set at the center of the mold. After 4 days of curing at 25° C. and 55% humidity, the molded product is subjected to tension at a rate of 500 mm/min at 25° C. to measure its bondability to ready-mixed concrete.

"Cohesive failure" means that the fracture takes place in the sealant, not at the joint face between the concrete and the sealant.

As described above, the sealant according to the present invention can be produced by simply kneading together the necessary components. Since tall pitch and atactic polypropylene, i.e., the components required, are both inexpensive materials obtained as by-products, the production cost is low. Meanwhile the product containing tall pitch and atactic polypropylene manifests a far higher resistance to aging in outdoor use than the conventional sealant containing reclaimed butyl rubber.

What is claimed is:

1. A sealant for concrete joints comprising tall pitch, atactic polypropylene, non-reclaimed rubber and 4.8 to 45 weight percent of aliphatic hydrocarbon resin.

2. A sealant for concrete joints according to claim 1, comprising from 4 to 40 weight percent of tall pitch, from 20 to 50 weight percent of atactic polypropylene, and from 6 to 30 percent of non-reclaimed rubber.

3. A sealant according to claim 1 or 2, wherein the non-reclaimed rubber is selected from the group consisting of butyl rubber and styrenebutadiene rubber.

4. A sealant according to claim 1 or 2, further comprising an anti-aging agent and a filler.

5. A sealant according to claim 4, wherein said filler is selected from the group consisting of calcium carbonate, talc and clay.

6. A sealant according to claim 3, further comprising an anti-aging agent and a filler.

7. A sealant according to claim 6, wherein said filler is selected from the group consisting of calcium carbonate, talc and clay.

* * * * *